United States Patent [19]

Jones

[11] Patent Number: 5,523,011
[45] Date of Patent: *Jun. 4, 1996

[54] NEAR AZEOTROPIC MIXTURE SUBSTITUTE

[75] Inventor: Jack A. Jones, Los Angeles, Calif.

[73] Assignee: California Institute of Technology, Pasadena, Calif.

[*] Notice: The term of this patent shall not extend beyond the expiration date of Pat. No. 5,512,197.

[21] Appl. No.: 212,700

[22] Filed: Mar. 11, 1994

Related U.S. Application Data

[63] Continuation of Ser. No. 672,947, Mar. 21, 1991, abandoned, which is a continuation of Ser. No. 503,465, Mar. 23, 1990, abandoned.

[51] Int. Cl.$^6$ .................................................. C09K 5/04
[52] U.S. Cl. ............................................ 252/67; 62/114
[58] Field of Search .................. 252/67, DIG. 9; 62/114

[56] References Cited

U.S. PATENT DOCUMENTS

| | | | |
|---|---|---|---|
| 4,155,865 | 5/1979 | Ostrozynski et al. | 252/67 |
| 4,810,403 | 3/1989 | Bivens et al. | 252/67 |
| 4,983,312 | 1/1991 | Tamura et al. | 252/67 |
| 5,262,077 | 11/1993 | Bivens et al. | 252/67 |
| 5,304,319 | 4/1994 | Yoshida et al. | 252/67 |

FOREIGN PATENT DOCUMENTS

| | | |
|---|---|---|
| 1-108291 | 4/1989 | Japan. |
| 1-153786 | 6/1989 | Japan. |
| 1-141982 | 6/1989 | Japan. |
| 1-168785 | 7/1989 | Japan. |
| 89/02455 | 3/1989 | WIPO. |

*Primary Examiner*—Christine Skane
*Attorney, Agent, or Firm*—Limbach & Limbach; W. Patrick Bengtsson; Patricia Coleman James

[57] ABSTRACT

The present invention comprises a refrigerant mixture consisting of a first mole fraction of 1,1,1,2-tetrafluoroethane (R134a) and a second mole fraction of a component selected from the group consisting of a mixture of $CHClFCF_3$ (R124) and $CH_3CClF_2$ (R142b); a mixture of $CHF_2CH_3$ (R152a) and $CHClFCF_3$ (R124); a mixture of $CHF_2CH_3$ (R152a) and $CH_3CClF_2$ (R142b); and a mixture of $CHClFCF_3$ (R124), $CH_3CClF_2$ (R142b) and $CHF_2CH_3$ (R152a).

7 Claims, 6 Drawing Sheets

NEAR AZEOTROPIC MIXTURE SUBSTITUTE

ORIGIN OF THE INVENTION

The invention described herein was made in the performance of work under a NASA contract, and is subject to the provisions of Public Law 96-517 (35 USC 202) in which the Contractor has elected to retain title.

This is a continuation of application Ser. No. 07/672,947 filed on Mar. 21, 1991, now abandoned, which is a continuation of Ser. No. 07/503,465 filed on Mar. 23, 1990, now abandoned.

TECHNICAL FIELD

This invention relates to the field of refrigerants for air conditioner systems and more particularly to a replacement for dichlorodifluoromethane.

BACKGROUND ART

Chlorofluorocarbons (CFCs) have been used in refrigerators and air conditioners for many years. Dichlorodifluoromethane or refrigerant 12 (R12) has been the refrigerant of choice for automotive air conditioning systems ever since it was developed in 1930. The history of this development is discussed in detail in "Development of Chlorofluorocarbon Refrigerants", by R. Downing, ASHRAE Transactions 90 pt. 2, pp. 481–91, 1984. R12 is widely used in automobiles because it is non-flammable, low in toxicity, and compatible with the lubricants used in automotive air conditioning systems. Moreover it has the right combination of physical properties, such as boiling point and vapor pressure, to permit efficient use in these systems. However, over the years, large amounts of R12 have been released into the atmosphere as a result of damaged, leaky, or abandoned air conditioners as well as routine maintenance on these devices.

In 1974, it was postulated that chlorofluoromethanes as well as other chlorofluorocarbons are damaging to the earth's ozone layer. This research was reported in "Stratospheric SInk for Chlorofluoromethanes: Chlorine atom catalyzed Destruction of Ozone" by M. J. Molina and F. S. Rowland, Nature, 249:810–12, 1974. This theory has been confirmed recently by the discovery of ozone "holes" over the Arctic and Antarctic. Richard A. Kerr reported in Research News, pp. 1489–92, Mar. 25, 1988, that the ozone layer over latitudes corresponding to the United States has reduced about 5%.

The ozone layer acts as a barrier to UV radiation from the sun. Since UV radiation damages living organisms, destruction of the ozone layer would have a serious impact on life on this planet. In fact there is strong evidence that human skin cancer rates are on the rise and that phytoplankton in the ocean have been reduced by 25%.

This has resulted in a world-wide effort to eliminate release of ozone depleting CFCs into the atmosphere, culminating in Montreal in 1987 in the signing of an international agreement. The "Montreal Protocol" sets up a worldwide process to reduce production and consumption of materials that can damage the ozone layer. In response to this agreement, the aerosol, industrial cleaning and foam insulation industries are starting to use alternatives to CFCs. There was report of a proposal to ban automotive air conditioners in the Los Angeles Times on Jul. 18, 1989.

The ideal replacement refrigerant would be a single compound: failing that an azeotropic or near-azeotropic mixture would work. An azeotrope is a mixture whose composition and physical properties remain constant with evaporation. A near-azeotrope is a mixture whose composition and physical properties remain nearly constant with evaporation. While several investigators have researched replacements for automotive air conditioner refrigerants, the best replacements so far, 1,1,1,2-tetrafluoroethane (R134a) and a blend covered by U.S. Pat. No. 4,810,403, suffer from serious deficiencies. Since R134 a contains no chlorine, is not compatible with the lubricants used in present automotive air conditioners. Although the patented blend is compatible with such lubricants, it is not azeotropic and thus refrigerant leaks could substantially change its pressure characteristics.

If a near-azeotropic refrigerant mixture could be found that was non-flammable, low in toxicity, compatible with the lubricants used in automotive air conditioning systems, had the right combination of physical properties, such as boiling point and vapor pressure, to permit efficient use in these systems, and was less damaging to the Earth's ozone layer it would satisfy a long felt need in the field of automotive air conditioning technology. Use of this refrigerant would eliminate atmospheric damage caused by automotive air conditioners, ensure compliance of automotive air conditioner systems with international agreements and thus eliminate the need to ban such air conditioners.

STATEMENT OF THE INVENTION

The present invention is directed towards a refrigerant mixture comprising essentially two halocarbon components. The first halocarbon component and the second halocarbon component are present in essentially near azeotropic proportions which is approximately equal to the first halocarbon component being present in a mole fraction of about 0.5 to less than 1.0 while the second halocarbon component is present in a mole fraction of about more than 0.0 to about 0.5. In the most preferred embodiment, the first halocarbon component is present in a mole fraction of about 0.7 to less than 1.0 while the second halocarbon component is present in a mole fraction of about more than 0.0 to about 0.3. The first halocarbon component is $CH_2FCF_3$ (R134a). The second halocarbon component can be $CHClFCF_3$ (R124), $CH_3CClF_2$ (R142b), a mixture of $CHClFCF_3$ and $CH_3CClF_2$, a mixture of $CHF_2CH_3$ (R152a) and $CHClFCF_3$, a mixture of $CHF_2CH_3$ and $CH_3CClF_2$, or a mixture of $CHClFCF_3$, $CH_3CClF_2$ and $CHF_2CH_3$.

The resulting refrigerant has a vapor pressure close to that of $CF_2Cl_2$, a nearly constant vapor pressure with evaporation, and is substantially less damaging to the earth's ozone layer than $CF_2Cl_2$.

The preferred embodiment of this invention comprises about 0.5 (more preferably about 0.7) to less than 1.0 mole fraction $CH_2FCF_3$, and more than 0.0 to about 0.5 (more preferably about 0.3) mole fraction of a mixture of $CHClFCF_3$ and $CH_3CClF_2$.

The most preferred embodiment of this invention comprises about 0.5 (more preferably about 0.7) to less than 1.0 mole fraction $CH_2FCF_3$ and more than 0.0 to about 0.5 (more preferably about 0.3) mole fraction $CH_3CClF_2$.

BRIEF DESCRIPTION OF THE DRAWINGS

FIG. 6 shows vapor pressure curves for the quaternary mixture of R134a, R124, R142b and R152a at 0 degrees C. FIG. 6(a) represents 90% R134a while FIG. 6(b) represents 80% R134a.

DESCRIPTION OF THE INVENTION

The present invention contains at least two halocarbons, one of which is R134a. This invention comprises the mixtures shown in Table 1.

TABLE 1

| Mixture | Component A | Component B |
|---------|-------------|-------------|
| 1 | R134a | R124 |
| 2 | R134a | R124b |
| 3 | R134a | R124 + R142b |
| 4 | R134a | R152A + R124 |
| 5 | R134a | R152a + R142b |
| 6 | R134a | R124 + R142b + R152a |

Component A is present in the mixtures in a mole fraction of from about 0.5 (more preferably about 0.7) to less than 1.0 while Component B is present in the mixtures in a mole fraction of from more than 0.0 to about 0.5 (more preferably about 0.3). These mixtures were developed by reviewing the available literature to select components that have a boiling point in the range of −82 degrees C. and −5 degrees C., low toxicity, low ozone damage potential and low flammability, and testing to confirm that they were in fact near-azeotropic. To ensure compatibility with compressor lubricants, each mixture was formulated to contain at least one chlorinated compound.

A summary of literature data for the components of these mixtures is shown in Table 2. For comparison purposes, the literature data for R12 is also shown in Table 2.

TABLE 2

|  | Boiling point (degrees C.) | Vapor Pressure (psia)@ 0 deg. C. | Ozone damage potential* | Toxicity (in ppm) | Flammability (vol % in air) |
|---|---|---|---|---|---|
| R134a | −26.5 | 42.47 | 0 | 1000 | None |
| R124 | −12 | 32.72 | <0.05 | NA | None |
| R142b | −9.7 | NA | <0.05 | 1000 | 6.7–14.9 |
| R152a | −25 | NA | 0 | 1000 | 3.9–16.9 |
| R12 | −29.8 | 44.7 | 1 | 1000 | None |

*compared to R12.

To test for azeotropic properties, various binary, ternary and quaternary mixtures were measured for vapor pressure at a constant temperature of 0 degrees C. The results of these tests are summarized in FIGS. 1 through 6. It can be seen from the Figures that the vapor pressure of each mixture averages around 40 psia, which is close to the vapor pressure of R12. Further the vapor pressure of each mixture varies little with composition.

All of the above data suggest that each embodiment shown in Table 1 is near-azeotropic, non-flammable, non-toxic, and compatible with air conditioner lubricants while being at least 67 times less damaging to the ozone layer than R12. Thus any of the mixtures of Table 1 can be used as a direct replacement for R12.

Figure 1:
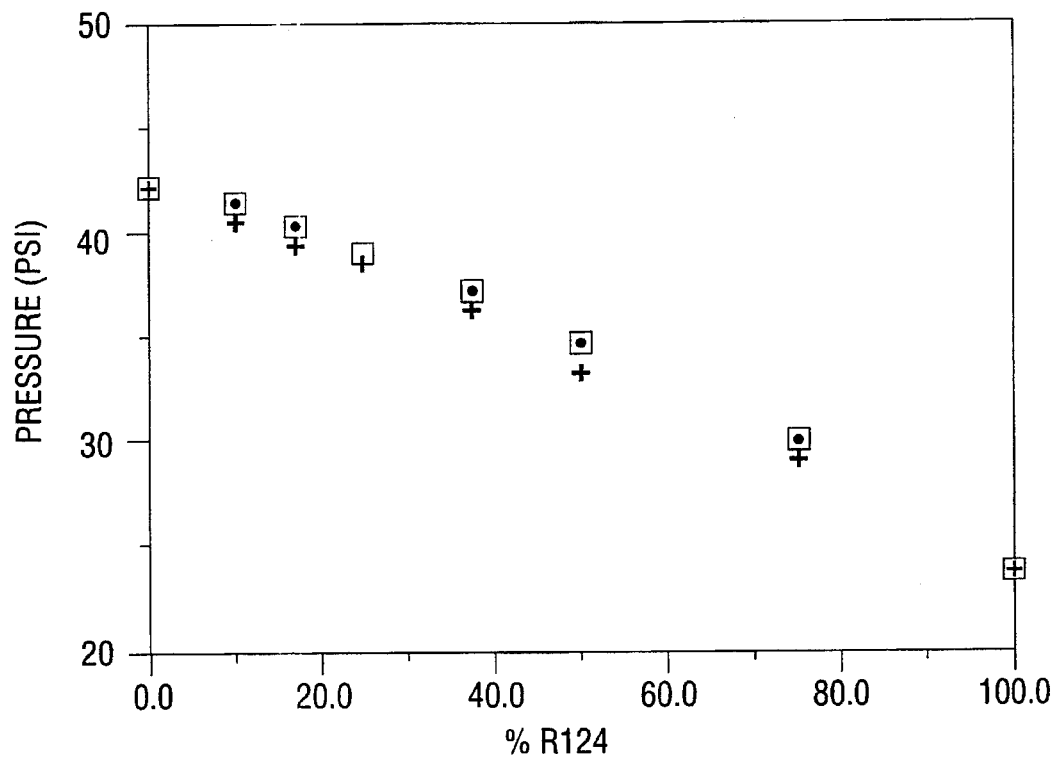
FIG. 1 shows vapor pressure curves for the binary mixture of R134a and R124 at 0° C.
Figure 2:
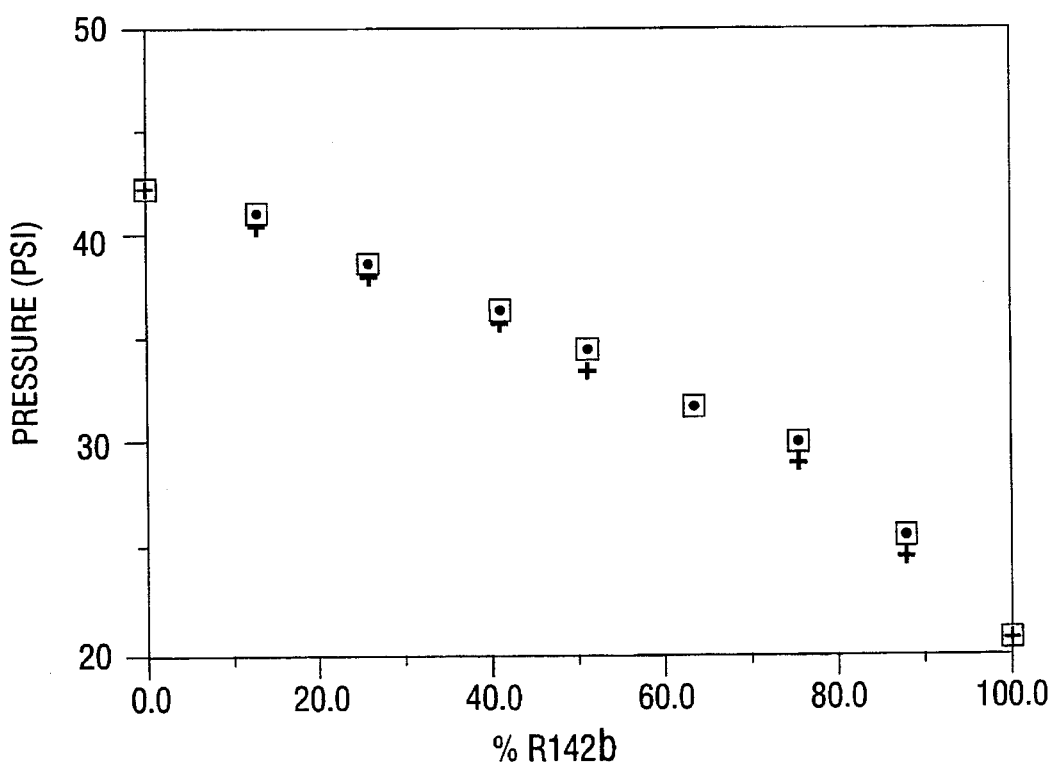
FIG. 2 shows vapor pressure curves for the binary mixture of R134a and R142b at 0 degrees C.
Figure 3:
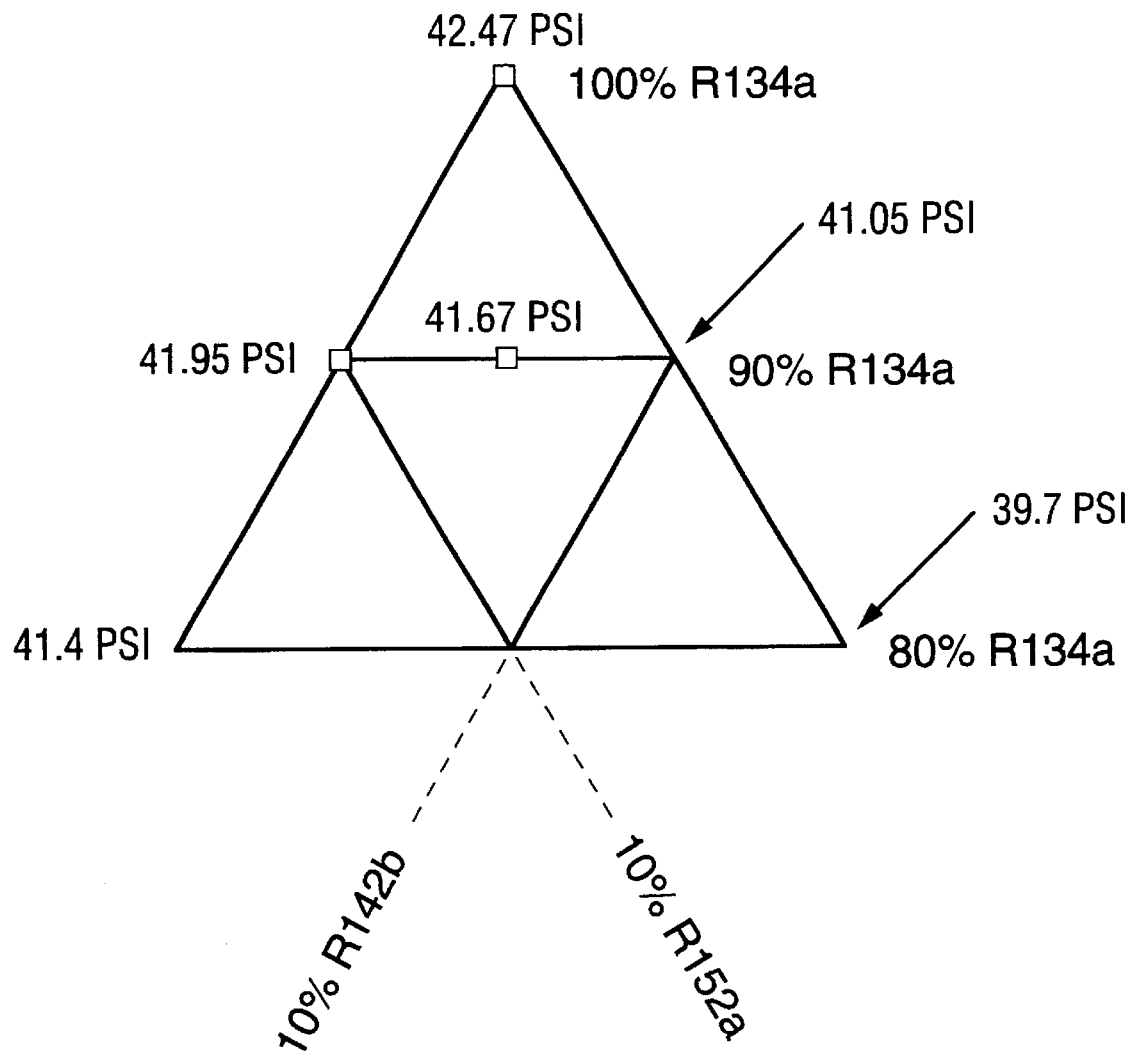
FIG. 3 shows vapor pressure curves for the ternary mixture of R134a, R152a and R142b at 0 degrees C.
Figure 4:
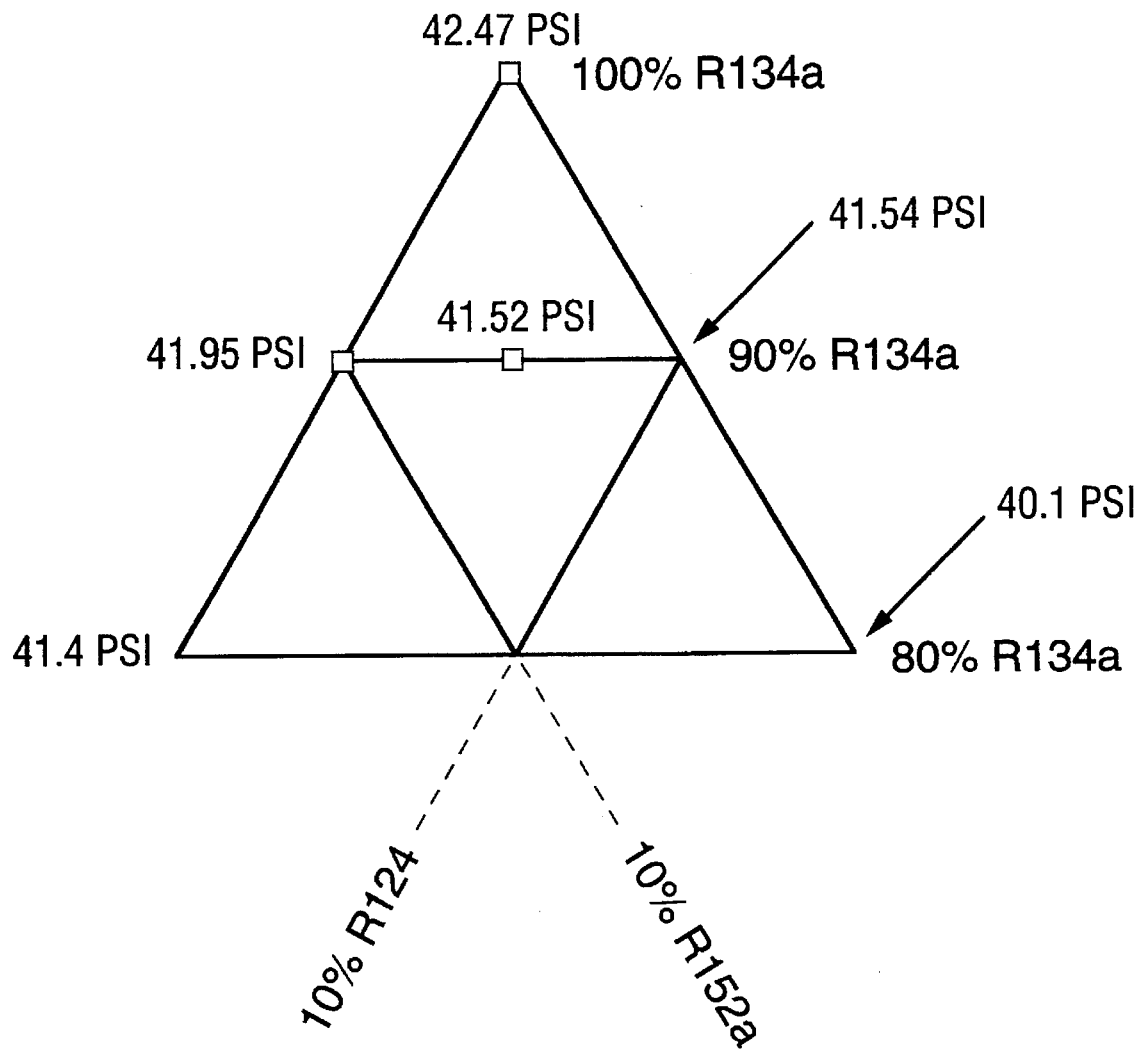
FIG. 4 shows vapor pressure curves for the ternary mixture of R134a, R152a and R124 at 0 degrees C.
Figure 5:
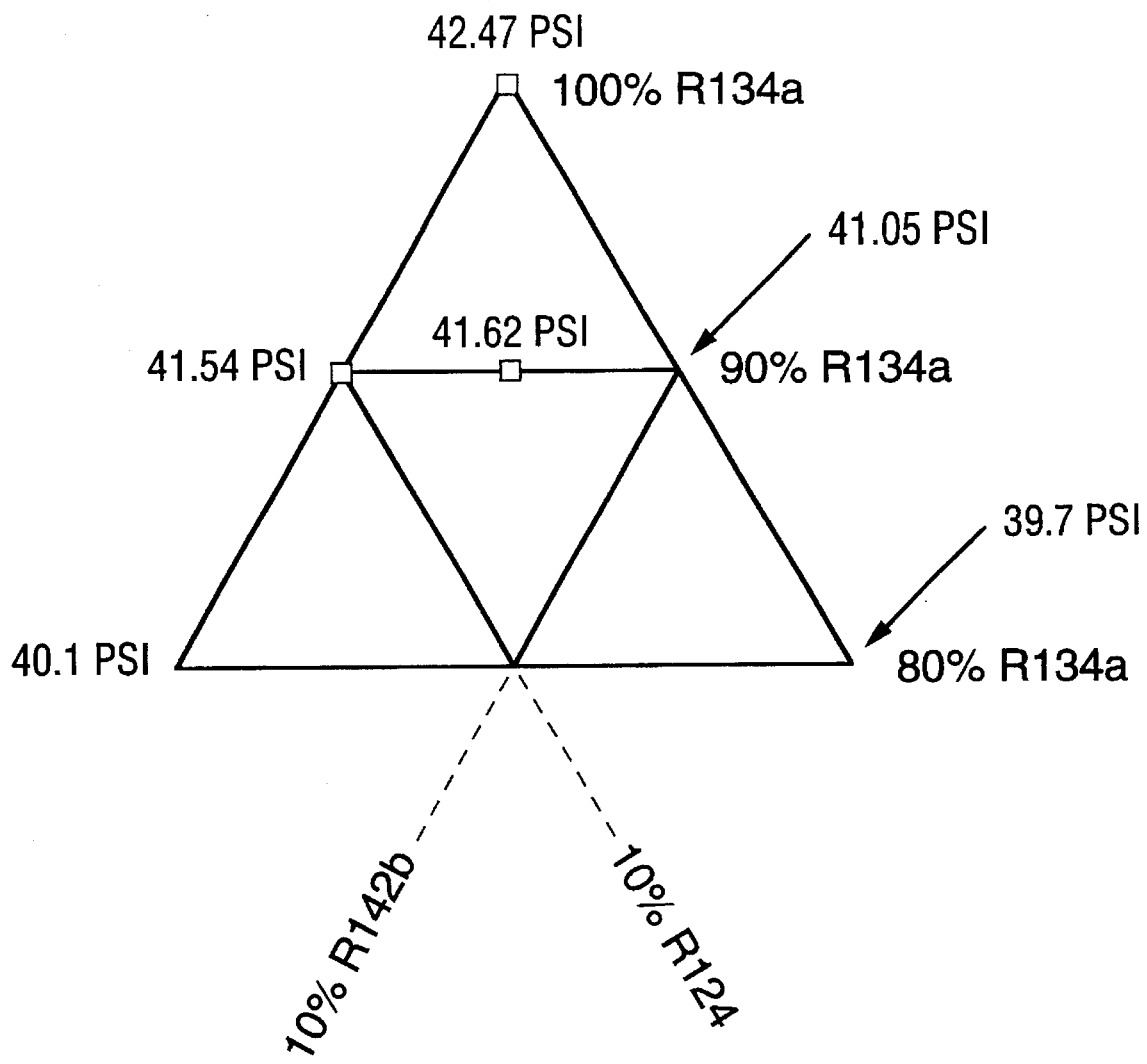
FIG. 5 shows vapor pressure curves for the ternary mixture of R134a, R124 and R142b at 0 degrees C.
Figure 6A:
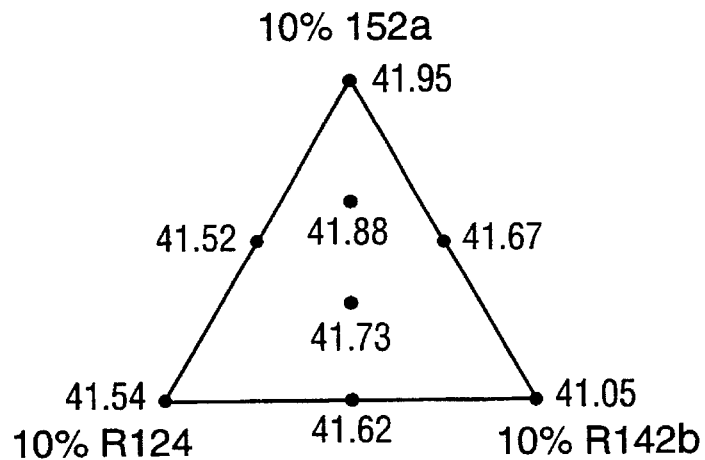
Figure 6B:
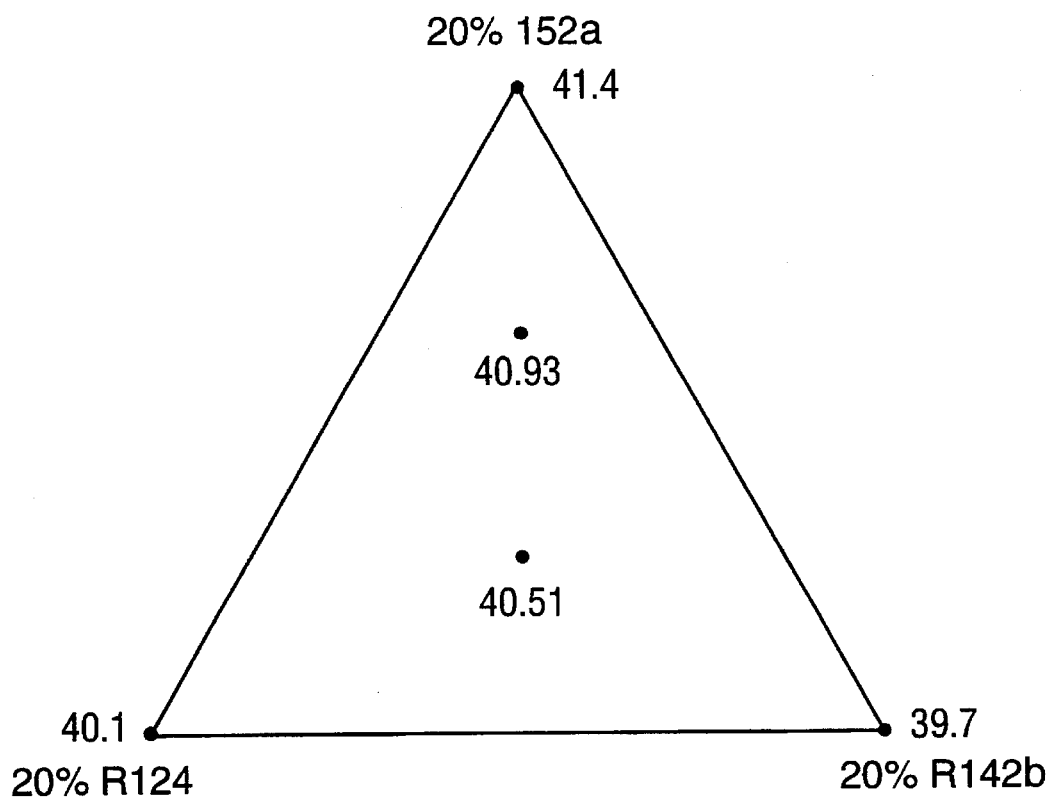
Figure 7:
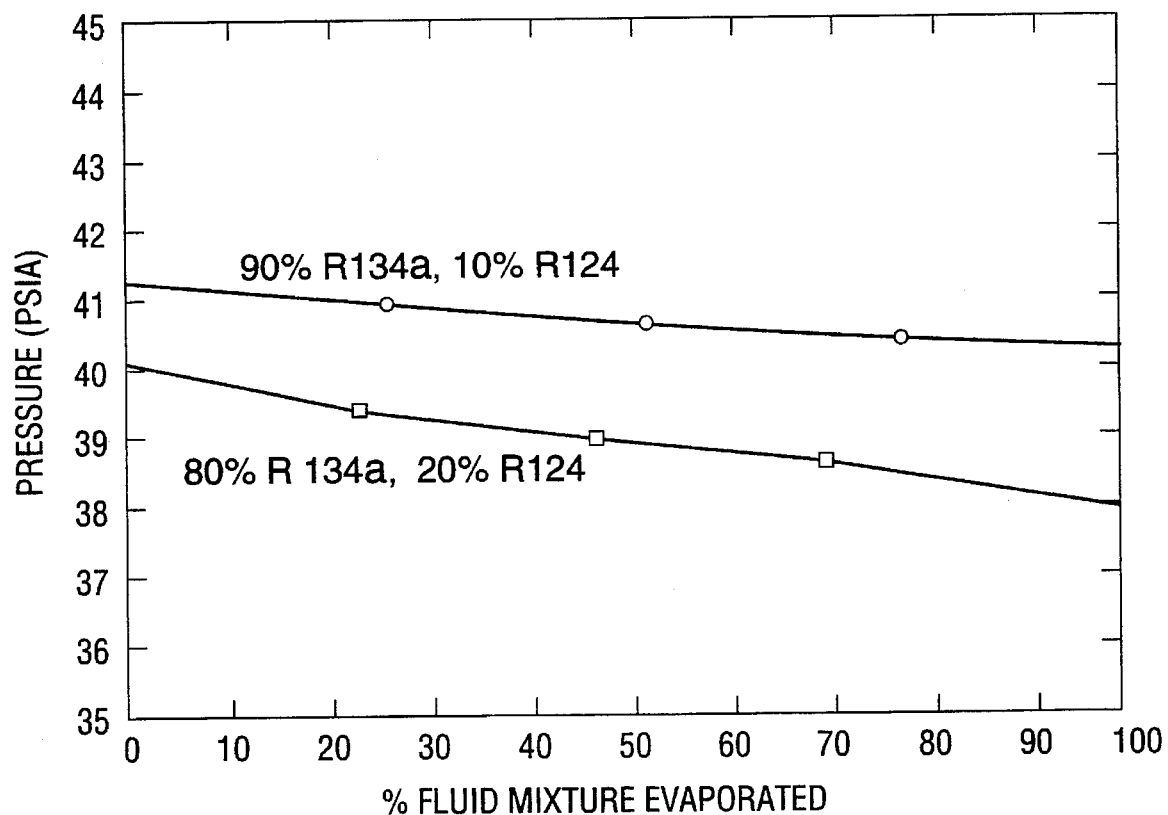
FIG. 7 shows the near-azeotropic vapor pressure leakage characteristics for a typical mixture (R134a and R124).

The research has shown that mixture 3 of Table 1 is the preferred embodiment of this invention and mixture 2 of Table 1 is the most preferred embodiment of this invention because R142b has the highest solubility in present refrigeration lubricating oils. The near-azeotropic leakage characteristics of a typical mixture (R134a and R124) are shown in FIG. 7.

Although the present invention has been described in detail with reference to particular preferred embodiments, persons possessing ordinary skill in the art to which this invention pertains will appreciate that various modifications and enhancements may be made without departing from the spirit and scope of the claims that follow.

LIST OF ABBREVIATIONS

| Number | Formula | Name |
|--------|---------|------|
| Chemicals | | |
| R12 | $CCl_2F_2$ | Dichlorodifluoromethane |
| R134a | $CH_2FCF_3$ | 1,1,1,2-Tetrafluoroethane |
| R124 | $CHClCF_3$ | 2-Chloro-1,1,1,2-tetrafluoroethane |
| R142b | $CH_3CClF_2$ | 1-Chloro-1,1-difluoroethane |
| R152a | $CHF_2CH_3$ | 1,1-Difluoroethane |
| Other | | |
| ppm | parts per million | |
| psia | pounds per square inch, absolute | |
| ASHRAE | American Society of Heating, Refrigerating and Air-Conditioning Engineers | |

I claim:

1. A refrigerant consisting of a mixture of a first mole fraction of about 0.8 to less than 1.0 of $CH_2FCF_3$ and a second mole fraction of more than 0.0 to about 0.2 of a component selected from the group consisting of:

a mixture of $CHClFCF_3$ and $CH_3CClF_2$;

a mixture of $CHF_2CH_3$ and $CHClFCF_3$;

a mixture of $CHF_2CH_3$ and $CH_3CClF_2$; and a mixture of $CHClFCF_3$, $CH_3CClF_2$ and $CHF_2CH_3$.

2. A method of formulating a refrigerant comprising the steps of;

providing a first mole fraction of about 0.8 to less than 1.0 of $CH_2FCF_3$, and adding a second mole fraction of more than 0.0 to about 0.2 of a halocarbon selected from the group consisting of:

a mixture of $CHClFCF_3$ and $CH_3CClF_2$;

a mixture of $CHF_2CH_3$ and $CHClFCF_3$;

a mixture of $CHF_2CH_3$ and $CH_3CClF_2$; and a mixture of $CHClFCF_3$, $CH_3CClF_2$ and $CHF_2CH_3$;

said refrigerant consisting of said first and second mole fractions.

3. A refrigerant consisting of the ternary mixture of $CH_2FCF_3$, $CHF_2CH_3$ and $CH_3CClF_2$ defined by the triangular diagram of FIG. 3 and having the vapor pressures at 0 degrees C. shown therein.

4. A refrigerant consisting of the ternary mixture of $CH_2FCF_3$, $CHF_2CH_3$ and $CHClFCF_3$ defined by the triangular diagram of FIG. 4 and having the vapor pressures at 0 degrees C. shown therein.

5. A refrigerant consisting of the ternary mixture of $CH_2FCF_3$, $CHClFCF_3$ and $CH_3CClF_2$ defined by the triangular diagram of FIG. 5 and having the vapor pressures at 0 degrees C. shown therein.

6. A refrigerant consisting of the quaternary mixture of $CH_2FCF_3$, $CHClFCF_3$, $CH_3CClF_2$ and $CHF_2CH_3$ defined by the triangular diagram of FIG. 6a and having the vapor pressures at 0 degrees C. shown therein, said diagram representing the case where $CH_2FCH_3$ is about 90 mole percent.

7. A refrigerant consisting of the quaternary mixture of $CH_2FCF_3$, $CHClFCF_3$, $CH_3CClF_2$ and $CHF_2CH_3$ defined by the triangular diagram of FIG. 6(b) and having the vapor pressures at 0 degrees C. shown therein, said diagram representing the case where $CH_2FCH_3$ is about 80 mole percent.

* * * * *